United States Patent [19]

Dessau et al.

[11] Patent Number: 4,658,075
[45] Date of Patent: Apr. 14, 1987

[54] XYLENE ISOMERIZATION WITH A REACTIVATED ZEOLITE

[75] Inventors: Ralph M. Dessau, Edison; George T. Kerr, Lawrenceville, both of N.J.

[73] Assignee: Mobil Oil Corporation, New York, N.Y.

[21] Appl. No.: 796,678

[22] Filed: Nov. 12, 1985

Related U.S. Application Data

[60] Continuation-in-part of Ser. No. 608,737, May 10, 1984, abandoned, which is a division of Ser. No. 458,398, Jan. 17, 1983, Pat. No. 4,461,845.

[51] Int. Cl.$^4$ ............................................. C07C 5/22
[52] U.S. Cl. .................................... 585/481; 585/467; 585/475
[58] Field of Search ................................ 585/475, 481

[56] References Cited

U.S. PATENT DOCUMENTS

| | | | |
|---|---|---|---|
| 3,702,886 | 11/1972 | Argauer et al. | 423/328 |
| 4,306,106 | 12/1981 | Kerr et al. | 585/640 |
| 4,461,845 | 7/1984 | Dessau et al. | 502/27 |
| 4,477,582 | 10/1984 | Miale | 208/120 |
| 4,500,421 | 2/1985 | Chang et al. | 208/120 |
| 4,500,422 | 2/1985 | Miale et al. | 208/120 |
| 4,515,682 | 5/1985 | Chang et al. | 585/640 |
| 4,517,075 | 5/1985 | Dessau et al. | 585/640 |
| 4,530,756 | 7/1985 | Chang et al. | 208/120 |

*Primary Examiner*—John Doll
*Assistant Examiner*—Lance Johnson
*Attorney, Agent, or Firm*—Alexander J. McKillop; Michael G. Gilman; Dennis P. Santini

[57] ABSTRACT

A process is provided for converting feedstock comprising aromatic compounds to product comprising aromatic compounds which differs from the feedstock over catalyst prepared by a method for reactivating a catalyst composition comprising a crystalline zeolite material having a silicon/aluminum atomic ratio of at least about 2, said catalyst composition having been deactivated by contact with steam. The catalyst preparation method involves contacting said steam-deactivated catalyst composition with an aluminum compound at elevated temperature, and contacting said aluminum compound contacted catalyst composition with an aqueous acid solution.

13 Claims, No Drawings

XYLENE ISOMERIZATION WITH A REACTIVATED ZEOLITE

CROSS REFERENCE

This is a continuation-in-part of application Ser. No. 608,737, filed May 10, 1984 now abandoned, which is a division of application Ser. No. 458,398, filed Jan. 17, 1983, and issued as U.S. Pat. No. 4,461,845, the entire contents thereof being incorporated herein by reference.

BACKGROUND OF THE INVENTION

1. Field of the Invention

This invention relates to use of a catalyst composition resulting from a method for reactivating certain catalyst compositions comprising crystalline materials which have been steam-deactivated, said method involving contact with an aluminum compound followed by controlled treatment with an acid solution. In particular, this invention relates to conversion of feedstock comprising aromatic compounds to product comprising aromatic compounds which differs from the feedstock over such a catalyst composition.

2. Description of the Invention

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite Z (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871 (U.S. Pat. No. Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724, 4,073,865 and 4,104,294 describe crystalline silicas of varying aluminum and metal content.

The reactivation of steam-deactivated catalysts comprising such zeolites has been a prime objective of the petrochemical and refining industries. In contrast to coke-deactivated catalysts which can be readily regenerated by air oxidation, no adequate technique has been heretofore developed for reactivation of steam-deactivated catalysts. Steam deactivation apparently involves removal of aluminum from zeolitic framework, a result which until now has been believed to be largely irreversible.

It is noted that U.S. Pat. Nos. 3,354,078 and 3,644,220 relate to treating crystalline aluminosilicates with volatile metal halides, including aluminum chloride. Neither of these latter patents is, however, concerned with treatment of catalysts comprising zeolites, especially zeolites having initially a high silicon/aluminum atomic ratio, which have been deactivated by contact with steam.

U.S. Pat. No. 4,354,049 teaches aromatization of $C_2$–$C_{12}$ aliphatic hydrocarbons in the vapor phase over catalyst comprising a zeolite having a $SiO_2/Al_2O_3$ molar ratio of greater than 12/1 which has been exchanged or impregnated with aluminum.

U.S. Pat. No. 4,380,685 teaches para-selective alkylation, transalkylation or disproportionation of a substituted aromatic compound to form a dialkylbenzene compound mixture over catalyst comprising zeolite characterized by a Constraint Index of 1 to 12 and a silica:alumina mole ratio of at least 12:1, the catalyst having thereon incorporated various metals and phosphorus. Other patents covering alkylation and transalkylation include U.S. Pat. Nos. 4,127,616, 4,361,713, 4,365,104, 4,367,359, 4,370,508 and 4,384,155. Toluene is converted to para-xylene in U.S. Pat. Nos. 3,965,207, 3,965,208, 3,965,209, 4,001,346, 4,002,698, 4,067,920, 4,100,215 and 4,152,365, to name a few. Alkylation with olefins is taught, for example, in U.S. Pat. Nos. 3,962,364 and 4,016,218 and toluene is disproportionated in, for example, U.S. Pat. Nos. 4,052,476, 4,007,231, 4,011,276, 4,016,219 and 4,029,716. Isomerization of xylenes is taught in, for example, U.S. Pat. Nos. 4,100,214, 4,101,595, 4,158,676, 4,159,282, 4,351,979, 4,101,597, 4,159,283, 4,152,363, 4,163,028, 4,188,282 and 4,224,141.

SUMMARY OF THE INVENTION

The present invention relates to a novel process for converting aromatics. The process uses catalyst compositions comprising crystalline zeolites having a silicon/aluminum atomic ratio of at least 2, especially those zeolites having a silicon/aluminum atomic ratios of greater than 10, such as, for example, greater than 50, which have been deactivated by contact with steam. The catalyst for use herein is prepared by the steps of contacting said steam-deactivated catalyst composition with an aluminum compound, such as, for example, aluminum halide, e.g. aluminum chloride, at an elevated temperature, followed by contacting said catalyst composition with an aqueous acid solution, such as, for example, an acid solution having a pH of less than about 5, e.g. less than about 2. The resulting reactivated catalyst composition exhibits enhanced Bronsted acidity and, therefore, improved acid catalytic activity.

EMBODIMENTS

This invention is concerned with the treatment of catalysts comprising crystalline material having a silicon/aluminum atomic ratio of at least 2, especially those crystalline materials having high silicon/aluminum atomic ratios of greater than 10, such as, for example, greater than 50, which have been steam-deactivated. The expression "high silicon crystalline material" is intended to define a crystalline structure which has a silicon/aluminum atomic ratio greater than about 10, more preferably greater than about 50, still more preferably greater than about 100, up to and including those highly siliceous materials where the silicon/aluminum atomic ratio is as reasonably close to infinity as practically possible. This latter group of high silicon crystalline materials is exemplified by U.S. Pat. Nos. 3,941,871; 4,061,724; 4,073,865 and 4,104,294 wherein the materials are prepared from reaction solutions which involve no deliberate addition of aluminum. Small quantities of aluminum are usually present in reaction solutions from which high silicon crystalline material is to be synthesized. It is to be understood that the expression "high silicon crystalline material" also specifically includes those materials which have other metals besides silicon and/or aluminum associated therewith, such as boron, iron, chromium, etc.

The catalyst preparation method is simple and easy to carry out although the results therefrom are unexpected and dramatic. The first necessary step of the method involves contacting a steam-deactivated catalyst composition comprising crystalline zeolite material, said zeolite material having a silicon/aluminum atomic ratio of at least about 2, with an aluminum compound, such as the halide, e.g. fluoride, chloride or bromide, at a temperature of from about 100° C. to about 850° C., preferably from about 100° C. to about 500° C. The second necessary step of the method involves contacting the aluminum compound contacted composition with an aqueous acid solution of from about 0.001 M to about 10 M, preferably from about 0.1 M to about 2 M, at a temperature of from about 20° C. to about 100° C.

Certain optional steps may be employed to tailor reactivation of steam-deactivated catalyst for use herein. The first optional step involves hydrolyzing the product catalyst from the above first necessary step. This may be accomplished by contact of the first necessary step product with, for example, water at a temperatuare of from about 20° C. to about 550° C. When the optional hydrolyzing step temperature is below 100° C. at atmospheric pressure, liquid water may be used. When the boiling point of water is exceeded, such as when the optional hydrolyzing step temperature exceeds 100° C. at atmospheric pressure, the catalyst product of the first necessary step may be purged with water saturated gas, e.g. helium.

Another optional step involves calcining the product catalyst from the above first necessary step or, if hydrolysis has been conducted as a first optional step as above indicated, the product of said optional hydrolysis step. This optional calcination step may be conducted at a temperature of from about 200° C. to about 600° C. in an inert atmosphere of air, nitrogen, etc. at subatmospheric, atmospheric or superatmospheric pressure for from about 1 minute to about 48 hours.

A further optional step involves calcining the product catalyst from the above second necessary step at a temperature of from about 200° C. to about 600° C. in an inert atmosphere of air, nitrogen, etc. at subatmospheric, atmospheric or superatmospheric pressure for from about 1 minute to about 48 hours.

During the first necessary step of contacting the steam-deactivated catalyst composition with an aluminum compound, said aluminum compound may be in vapor or liquid phase at the contacting temperature of from about 100° C. to about 850° C. By liquid phase, it is contemplated that the aluminum compound may be a melt or in aqueous or organic solution at the contacting temperature.

The aluminum compound contacting step (first necessary) may be accomplished in the vapor phase by admixture of the aluminum compound vapor with an inert gas such as nitrogen or helium at a temperature of from about 100° C. to about 850° C., preferably from about 100° C. to about 500° C. The amount of aluminum compound vapor which is utilized is not narrowly critical but usually from about 0.2 to about 2 grams of aluminum compound are used per gram of crystalline material in the catalyst composition. The aluminum compound may be an aluminum halide such as, for example, aluminum chloride.

The second necessary step of the method has been found to be critical in regenerating a catalyst composition comprising a crystalline zeolite material which has been deactivated by steam contact. In fact, when a steam-deactivated catalyst composition comprising a crystalline material, i.e. a high silicon crystalline zeolite, is contacted with an aluminum compound, i.e. aluminum chloride vapor, hydrolyzed and calcined under indicated conditions, no significant activity enhancement is observed. When the above steps are followed by contact with an aqueous acid solution, i.e. 1 M hydrochloric acid solution at appropriate coanditions, e.g. 75° C., and thereafter calcined as indicated, a dramatic increase in acid activity of the previously steam-deactivated material occurs.

The present process includes converting feedstock comprising aromatic compounds selected from the group consisting of benzene and monocyclic alkyl-substituted benzene of from 7 to 10 carbon atoms to product comprising aromatic compounds which differs from said feedstock, examples of which include isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 $hr^{-1}$ to about 200 hr$^{-1}$ and a hydrogen/hydrocarbon mole ratio of from 0 (no added hydrogen) to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 hr$^{-1}$ to about 20 hr$^{-1}$; alkylating aromatic hydrocarbons, e.g. benzene and $C_7$ and $C_8$ alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 hr$^{-1}$ to about 2000 hr$^{-1}$ and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 hr$^{-1}$ to about 1000 hr$^{-1}$ and an aromatic hydrocarbon/polyalkylaromatic hydrocarbon mole ratio of from about 1/1 to about 16/1.

Reaction conditions for the conversion of aromatics as above-detailed include, in general, a temperature of from about 200° C. to about 760° C., a pressure of from about atmospheric to about 200 atmospheres, a weight hourly space velocity of from about 0.08 hr$^{-1}$ to about 2000 hr$^{-1}$, and a hydrogen/feedstock aromatic hydrocarbon mole ratio of from 0 (no added hydrogen) to about 100.

Feedstock aromatic compounds converted hereby include individually and in mixture benzene and monocyclic alkyl-substituted benzene of from 7 to 10 carbon atoms having the structure

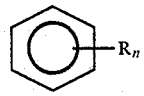

wherein R is methyl, ethyl or a combination thereof, and n is an integer of from 1 to 4. In other words, the feedstock aromatic compounds may be benzene, benzene containinq from 1 to 4 methyl and/or ethyl group substituents, and mixtures thereof. Non-limiting examples of such feedstock compounds include benzene, toluene, xylene, ethylbenzene, mesitylene (1,3,5-trimethylbenzene), durene (1,2,4,5-tetramethylbenzene), pseudocumene (1,2,4-trimethylbenzene) and mixtures thereof.

Other reactant species may be present, such as for alkylation. Alkylating agent species include olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Products of the present conversion process include alkyl-substituted benzene compounds which differ from feedstock compounds depending upon the conversion desired. The following listing presents non-limiting examples:

TABLE II

EFFECTS OF Al:Zr CATALYST COMPONENT RATIOS: PROPLYENE DIMERIZATION
TOLUENE SOLVENT: 20 ml
PROPYLENE: 25–27 g
CATALYST: $Cp_2ZrCl_2$ + methylaluminoxane
TEMP.: 35–47° C.
PRESSURE: Autogenic
REACTION TIME: 2 hrs.

| EXPT. NO. | Al:Zr ATOMIC RATIO | CONVERSION OF PROPYLENE, % | WEIGHT % SELECTIVITY TO VARIOUS DIMERS (NORMALIZED TO 100%) | | | |
|---|---|---|---|---|---|---|
| | | | 2-Me-1-PENTENE | 2,3-DIMETHYL-1-BUTENE | 2-Me-PENTANE | 2,3-DIMETHYL-BUTANE |
| 9(a) | 8:1 | 90 | 95.8 | 1.3 | 1.0 | 0.4 |
| 10(b) | 16:1 | 90 est. | 95.8 | 2.3 | 1.8 | 0.1 |
| 11(c) | 420:1 | 71 | 76 | 13 | 9 | 1 |

(a)Oligomer Composition: 97.6% $C_6$, 2.4% $C_9$, 0% $C_{12}$ (weight %).
(b)Oligomer Composition: 95.8% $C_6$, 4.2% $C_9$, 0% $C_{12}$ (weight %).
(c)Oligomer Composition: 30.3% $C_6$, 22.9% $C_9$, 23.1% $C_{12}$, 12.3% $C_{15}$, 7.8% $C_{18}$, 2.8% $C_{21}$, 0.87% $C_{24}$ (weight %).

Mechanisms of the present process may be isomerization, alkylation, transalkylation and disproportionation. Disproportionation is a special case of transalkylation in which the alkylatable aromatic compound and the transalkylating agent is the same compound, for example, when toluene serves as the doner and acceptor of the transferred methyl group to produce benzene and xylene. Use of the term transalkylation includes the special case of disproportionation.

Of the catalysts comprising crystalline zeolites having a silicon/aluminum atomic ratio of at least 2 which are advantageously reactivated after steam deactivation, those comprising zeolites of intermediate or large pore structure are noted. Intermediate pore structure zeolites provide a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra. Intermediate pore structure zeolites freely sorb normal hexane while access in the larger molecules is constrained. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded.

A simple determination of "Constraint Index" as herein defined may be made to determine degree of constrained access to molecules larger in cross-section than normal paraffins, and thereby whether a particular zeolite is composed of large or intermediate pores. Constraint Index may be determined by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and placed in a glass tube. Prior to testing, the zeolite is treated with a stream of air at 540° C. for at least 15 minutes. The zeolite is then flushed with helium and the temperature is adjusted between 290° C. and 538° C. to give an overall conversion of between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromotography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silicon/aluminum atomic ratio. In those instances, a temperature of up to about 538° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The test for Constraint Index is described in U.S. Pat. No. 4,016,218, incorporated herein by reference for further details in the test.

The Constraint Index approximates the ratio of the cracking rate constants for the two hydrocarbons. Intermediate pore size zeolites include those having a Constraint Index of from about 1 to 12. Large pore size zeolites generally include those having a Constraint Index of less than about 1. Constraint Index (CI) values for some typical materials are:

Zeolite ZSM-20 is described in U.S. Pat. No. 3,972,983, the entire contents of which are incorporated herein by reference. Zeolite Beta is described in U.S. Pat. No. 3,308,069, the entire contents of which are incorporated herein by reference.

Of the catalysts comprising high silicon crystalline materials advantageously treated in accordance herewith, steam-deactivated catalysts comprising zeolites ZSM-5 and ZSM-11 are particularly noted. ZSM-5 is described in U.S. Pat. No. 3,702,886 and U.S. Pat. No. Re.29,948, the entire contents of each being hereby incorporated by reference herein. ZSM-11 is described in U.S. Pat. No. 3,709,979, the entire teaching of which is incorporated herein by reference. Other catalysts comprising high silicon crystalline materials advantageously treated in accordance herewith include steam-deactivated catalysts comprising ZSM-5/ZSM-11 intermediate (U.S. Pat. No. 4,229,424, the entire contents of which are incorporated herein by reference), ZSM-12 (U.S. Pat. No. 3,832,449, the contents of which are incorporated herein by reference), ZSM-23 (U.S. Pat. No. 4,076,842, the entire contents of which are incorporated herein by reference), ZSM-35 (U.S. Pat. No. 4,016,245, the entire contents of which are incorporated herein by reference), and ZSM-38 (U.S. Pat. No. 4,046,859, the entire contents of which are incorporated herein by reference). ZSM-35 and ZSM-38 are synthetic ferrierite-type materials. Another such high silicon crystalline material is ZSM-48, described in U.S. Pat. No. 4,375,573, the entire contents of which are incorporated herein by reference.

Catalysts comprising crystalline materials having varying amounts of structural aluminum as well as metals such as, for example, boron, chromium, iron, etc. are reactivated after steam deactivation by the present process regardless of what other materials or metals are present in the crystal structure.

The catalyst comprising zeolite which has been steam-deactivated may be composed of the crystalline zeolite alone or said zeolite and a matrix comprising another material normally resistant to the temperature and other condition employed in a chemical conversion process. Such matrix material is useful as a binder and imparts greater resistance to the catalyst for the severe temperature, pressure and reactant feed stream velocity conditions encountered in many processes, such as, for example, cracking.

Useful matrix materials include both synthetic and naturally occurring substances, as well as inorganic materials such as clay, silica and/or metal oxides such as alumina. The latter may be either naturally occurring or

TABLE IV

OLIGOMERIZATION OF 1-HEXENE
TOLUENE (SOLVENT): 30 ml
Me$_3$Al, 4 mmoles + H$_2$O, 5 mmoles
Cp$_2$ZrCl$_2$: VARIABLE
HEXENE: 400 mmoles
TEMPERATURE: 40° C.

| EXPT. NO. 17554 | TIME HRS | Cp$_2$Zr$_2$Cl$_2$ mmoles | Al:Zn ATOMIC RATIO | 1-HEXENE CONVERSION % | WT % SELECTIVITY | | | | |
|---|---|---|---|---|---|---|---|---|---|
| | | | | | 2-HEXENE | C$_7$H$_{14}$ | DIMER | TRIMER | TETRAMER |
| 16 | 1 | 2.0 | 2 | 13.3 | 8.2 | 4.3 | 87.5 | 1.0 | |
| | 2 | | | 34.6 | 5.9 | 2.1 | 88.6 | 3.5 | |
| 17 | 1 | 1.0 | 4 | 63.1 | 4.1 | 1.7 | 91.1 | 3.8 | |
| | 2 | | | 92.5 | 2.5 | 1.2 | 94.5 | 1.9 | |
| 18 | 1 | 0.5 | 8 | 80.8 | 4.7 | 1.8 | 88.3 | 5.2 | |
| 19 | 1 | 0.25 | 16 | 58.6 | 7.0 | 3.2 | 84.6 | 4.7 | 0.6 |
| | 2 | | | 84.2 | 5.5 | 2.2 | 89.2 | 3.0 | 0.2 | in the form of gelatinous precipitates or gels including mixtures of silica and metal oxides. Naturally occurring clays which can be composited with the zeolite include those of the montmorillonite and kaolin families, which families include the sub-bentonites and the kaolines commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic matrix, on an anhydrous basis, may vary widely with the zeolite content ranging from about 1 to about 99 percent by weight and more usually in the range of from about 5 to about 80 percent by weight of the dry composite.

In order to more fully illustrate the nature of the invention and the manner of practicing same, the following examples are presented. In the examples, whenever Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,354,078 and in *The Journal of Catalysis*, Vol. IV, pp. 527–529 (August 1965), each incorporated herein by reference as to that description.

EXAMPLE 1

A high silicon crystalline material, i.e. zeolite ZSM-5 having a silicon/aluminum atomic ratio of about 42, was ammonium exchanged by refluxing the calcined crystalline material in 1 M $NH_4Cl$. The ammonium-exchanged ZSM-5 was then calcined for 60 minutes at 540° C. to provide an acid form zeolite ZSM-5, i.e. HZSM-5. The Alpha Value of this HZSM-5 was measured to be 190.

EXAMPLE 2

A first quantity of the high silicon crystalline zeolite product of Example 1 was contacted with 100% steam at 538° C. for 22 hours in order to damage, or deactivate, the zeolite. Examination of the Alpha Value of the steamed zeolite established severe deactivation. The Alpha Value was reduced from the pre-steamed 190 value to only 16.

EXAMPLE 3

One-half of the steam-deactivated zeolite of Example 2 was placed in a reactor vessel and contacted with 1M HCl solution for 3 hours at 75° C. The contacted zeolite was washed free of excess hydrochloric acid solution and tested for Alpha Value. It proved to have an Alpha Value of only 15. There was no acid activation of the steam-deactivated high silicon crystalline zeolite by the hydrochloric acid solution contacting.

EXAMPLE 4

The zeolite product of Example 3 was contacted with aluminum chloride vapor at 250° C. for 3 hours, and then heated to 500° C. for 1 hour. The aluminum chloride vapor contacted material was then contacted with water at 20° C. for 17 hours. The water contacted material was then calcined at 538° C. in air for 10 hours and again tested for acid activity. Its Alpha Value was only 15. There was no acid activation of the steam-deactivated high silica crystalline zeolite by the steps of hydrochloric acid solution contacting, followed by aluminum chloride vapor contacting, followed by hydrolysis and then calcination.

EXAMPLE 5

The product zeolite of Example 4 was then contacted with 1M HCl solution for 3 hours at 75° C. and calcined at 538° C. in air for 10 hours. The Alpha Value of the zeolite was again tested. It was 41, a dramatic increase not expected due to the results of Examples 3 and 4.

EXAMPLE 6

In order to obtain evidence establishing reactivation steps necessary for the present method, the second half of the steam-deactivated zeolite of Example 2 was placed in a reactor vessel and contacted with aluminum chloride vapor at 250° C. for 2 hours, and then heated to 500° C. for 1 hour. The aluminum chloride vapor contacted material was contacted with water at 20° C. for 17 hours and then calcined at 538° C. in air for 10 hours. The calcined material was then contacted with 1M HCl solution for 3 hours at 75° C. and again calcined at 538° C. in air for 10 hours. The Alpha Value of the product zeolite was measured to be 57. This was a 256 percent increase in activity.

For further evidence of reactivation method step sequence and effect, the following experiments were conducted.

EXAMPLE 7

A second quantity of the high siliconcrystalline zeolite product of Example 1 was contacted with 100% steam at 500° C. for 22 hours in order to damage, or deactivate, the zeolite. The Alpha Value of the product zeolite was 29, establishing severe deactivation.

EXAMPLE 8

One-half of the steam-deactivated zeolite product of Example 7 was placed in a reactor vessel and contacted with 1M HCl solution for 3 hours at 75° C. The hydrochloric acid solution contacted zeolite was calcined at 538° C. for 10 hours and then tested in the Alpha Test. Its Alpha Value was only 30.

EXAMPLE 9

The second half of the steam-deactivated zeolite product of Example 7 was placed in a reactor vessel and treated by the sequential steps of (1) contacting said deactivated zeolite with aluminum chloride vapor at 300° C. for 2 hours, and then heated to 500° C. for 1 hour, (2) contacting the step (1) product with water at 20° C. for 17 hours, (3) calcining the step (2) product at 538° C. The Alpha Value of the final product zeolite was measured to be 123. This was a 324 percent increase in activity.

EXAMPLE 10

A high silicon crystalline material, i.e. zeolite ZSM-5 having a silicon/aluminum atomic ratio of about 35, was ammonium exchanged as in Example 1, combined with 35 wt. % alumina matrix and extruded into extrudate particles (65 wt. % ZSM-5, 35 wt. % alumina). The extrudate product was calcined for 60 minutes in air at 538° C. to provide HZSM-5 extrudate established to have an Alpha Value of about 200.

EXAMPLE 11

The extrudate of Example 10 was contacted with 1 atmosphere steam at 600° C. for 2 hours. The Alpha Value of this steam damaged, or deactivated, zeolite extrudate was established to be only 14.

EXAMPLE 12

The steam deactivated extrudate of Example 11 was washed with 0.1 M sodium hydroxide solution to convert same to sodium form, then contacted with aluminum chloride vapor at 150° C. to 500° C. while heating at 2° C./minute, then contacted with water at 20° C. for 2 hours and then calcined at 538° C. in air for 10 hours. The extrudate treated in this manner was then tested for Alpha activity. Its Alpha Value was only 13.

EXAMPLE 13

The product extrudate of Example 12 was contacted with 1M hydrochloric acid solution at 75° C. for 3 hours and then calcined in air at 538° C. for 10 hours. The Alpha Value of the product of this example was established to be 78, a 457 percent increase from the value of 14 obtained for the steam-deactivated extrudate material of Example 11.

The following experiments were conducted to further establish effect of the present method upon steam-deactivated catalyst comprising a zeolite and a matrix.

EXAMPLE 14

A high silicon crystalline material, i.e. zeolite ZSM-5 having a silicon/aluminum atomic ratio of about 35, was ammonium exchanged as in Example 10 and then extruded with alumina binder to yield extrudate particles composed of 65 weight percent zeolite and 35 weight percent alumina.

EXAMPLE 15

The extrudate catalyst of Example 14 was steamed (100% steam) for 16 hours at 454° C. Its Alpha Value was measured to be about 70. It was further steamed (100% steam) at 538° C. for 22 hours. Its Alpha Value was then measured to be only 14.

EXAMPLE 16

The steam-deactivated catalyst extrudate of Example 15 (Alpha Value of 14) was placed in a reactor vessel and treated by the sequential steps of (1) contacting said deactivated extrudate catalyst with aluminum chloride vapor at 300° C. for 2 hours and then at 500° C. for 1 hour, (2) contacting the step (1) product with water at 20° C. for 17 hours, (3) calcining the step (2) product at 538° C. in air for 10 hours, (4) contacting the step (3) product with 1M HCl solution for 3 hours at 75° C., and (5) calcining the step (4) product in air for 10 hours at 538° C. The Alpha Value of the final product catalyst extrudate was measured to be 78. This was a 457 percent increase in activity.

EXAMPLE 17

To exemplify operation of the present invention, a 2 gram quantity of calcined product from Example 16 is placed in a reactor vessel and contacted with a feedstock comprised of 80% m-xylene and 20% ethylbenzene in the presence of added hydrogen at a ratio of hydrogen/hydrocarbons of 6.5/1. At reaction conditions including a temperature of 428° C., 58.5 WHSV ($hr^{-1}$) and a pressure of 10.2 atmospheres, approximately 52% of the m-xylene and 51% of the ethylbenzene are converted. The product is comprised as follows, values approximate:

| Product Component | Wt. % |
|---|---|
| Benzene | 4 |
| Toluene | 1 |
| Ethylbenzene | 9 |
| p-Xylene | 18 |
| m-Xylene | 39 |
| o-Xylene | 18 |
| Ethyltoluenes | 1 |
| Trimethylbenzenes | 3 |
| Other | 7 |

What is claimed is:

1. A process for converting a feedstock comprising xylene isomers to isomerization conversion product which comprises contacting said feedstock at conversion conditions sufficient to convert said feedstock to said product with a catalyst composition comprising a crystalline zeolite material having a silicon/aluminum atomic ratio of at least about 2, said catalyst composition having been deactivated by contact with steam and reactivated by the steps of
    contacting said steam-deactivated catalyst composition with an aluminum compound vapor at a temperature of from about 100° C. to about 850° C., and thereafter
    contacting said aluminum compound contacted catalyst composition with an aqueous acid solution of from about 0.001 molar to about 10 molar at a temperature of from about 20° C. to about 100° C.

2. The process of claim 1 wherein said crystalline zeolite material has a silicon/aluminum atomic ratio greater than 10.

3. The process of claim 1 wherein said aqueous acid solution is from about 0.1 molar to about 2 molar.

4. The process of claim 1 wherein said aluminum compound is aluminum halide.

5. The process of claim 1 which comprises the additional step of calcining said acid solution contacted catalyst composition at a temperature of from about 200° C. to about 600° C.

6. The process of claim 5 which comprises the additional step of calcining said aluminum compound contacted catalyst composition at a temperature of from about 200° C. to about 600° C. prior to said acid solution contacting step.

7. The process of claim 1 wherein said aluminum compound contacting step temperature is from about 100° C. to about 500° C., and said aqueous acid solution is from about 0.1 molar to about 1 molar.

8. The process of claim 1 wherein said crystalline zeolite material is selected from the group consisting of large pore structure zeolites exhibiting a Constraint Index of less than about 1 and intermediate pore structure zeolites exhibiting a Constraint Index of from about 1 to about 12.

9. The process of claim 1 wherein said crystalline zeolite material is selected from the group consisting of those having the structures of ZSM-5, ZSM-11, ZSM-5/ZSM-11 intermediate, ZSM-12, ZSM-20, ZSM-23, ZSM-35, ZSM-38, ZSM-48, zeolite Y and zeolite Beta.

10. The process of claim 1 wherein said catalyst composition is a composite of said zeolite material and a matrix.

11. The process of claim 10 wherein said matrix is alumina.

12. The process of claim 1 wherein said acid solution is an aqueous solution of hydrochloric acid.

13. The process of claim 1 wherein said conversion conditions include a temperature of from about 230° C. to about 510° C., a pressure of from about 3 atmospheres to about 35 atmospheres, a weight hourly space velocity of from about 0.1 $hr^{-1}$ to about 200 $hr^{-1}$ and a hydrogen/feedstock hydrocarbon compound mole ratio of from 0 to about 100.

* * * * *

UNITED STATES PATENT AND TRADEMARK OFFICE
CERTIFICATE OF CORRECTION

PATENT NO. : 4,658,075

DATED : April 14, 1987

INVENTOR(S) : Ralph M. Dessau et al

It is certified that error appears in the above-identified patent and that said Letters Patent is hereby corrected as shown below:

Col. 5 and 6, lines 15-32, entire Table 2, should be deleted and the following three-column listing of conversion process feedstock, other reactants and products should be inserted:

| Feedstock Aromatic Compounds Include | Other Reactants Include | Product Aromatic Compounds Include |
|---|---|---|
| Benzene Toluene Xylene isomers, e.g. 9:73:18 wt. ratio of para:meta:ortho | Ethylene Methanol | Ethylbenzene Xylene isomers Different combination of xylene isomers, e.g. 23:57:20 wt. ratio of para:meta:ortho |
| Toluene Benzene | Propylene | Benzene and xylenes Cumene and diisopropylbenzene |
| Toluene | Propylene | Cymene isomers |

Col. 7 and 8, lines 52-68, entire Table 4, should be deleted and the following two-column Constraint Index value list should be inserted:

UNITED STATES PATENT AND TRADEMARK OFFICE
CERTIFICATE OF CORRECTION

PATENT NO. : 4,658,075

DATED : April 14, 1987

INVENTOR(S) : Ralph M. Dessau et al

It is certified that error appears in the above-identified patent and that said Letters Patent is hereby corrected as shown below:

| ZEOLITE | CI (At Test Temperature) |
|---|---|
| -- ZSM-4 | 0.5 (316°C) |
| ZSM-5 | 6-8.3 (371°C-316°C) |
| ZSM-11 | 5-8.7 (371°C-316°C) |
| ZSM-12 | 2.3 (316°C) |
| ZSM-20 | 0.5 (371°C) |
| ZSM-22 | 7.3 (427°C) |
| ZSM-23 | 9.1 (427°C) |
| ZSM-34 | 50 (371°C) |
| ZSM-35 | 4.5 (454°C) |
| ZSM-38 | 2 (510°C) |
| ZSM-48 | 3.5 (538°C) |
| ZSM-50 | 2.1 (427°C) |
| TMA Offretite | 3.7 (316°C) |
| TEA Mordenite | 0.4 (316°C) |
| Clinoptilolite | 3.4 (510°C) |
| Mordenite | 0.5 (316°C) |
| REY | 0.4 (316°C) |
| Amorphous Silica-Alumina | 0.6 (538°C) |
| Dealuminized Y | 0.5 (510°C) |
| Erionite | 38 (316°C) |
| Zeolite Beta | 0.6-2.0 (316°C-399°C) -- |

Signed and Sealed this

Twelfth Day of January, 1988

Attest:

DONALD J. QUIGG

Attesting Officer

Commissioner of Patents and Trademarks